Sept. 15, 1970   R. L. SPEAKER ET AL   3,528,539
OVERHEAD CONVEYOR APPARATUS
Filed April 25, 1968   2 Sheets-Sheet 1
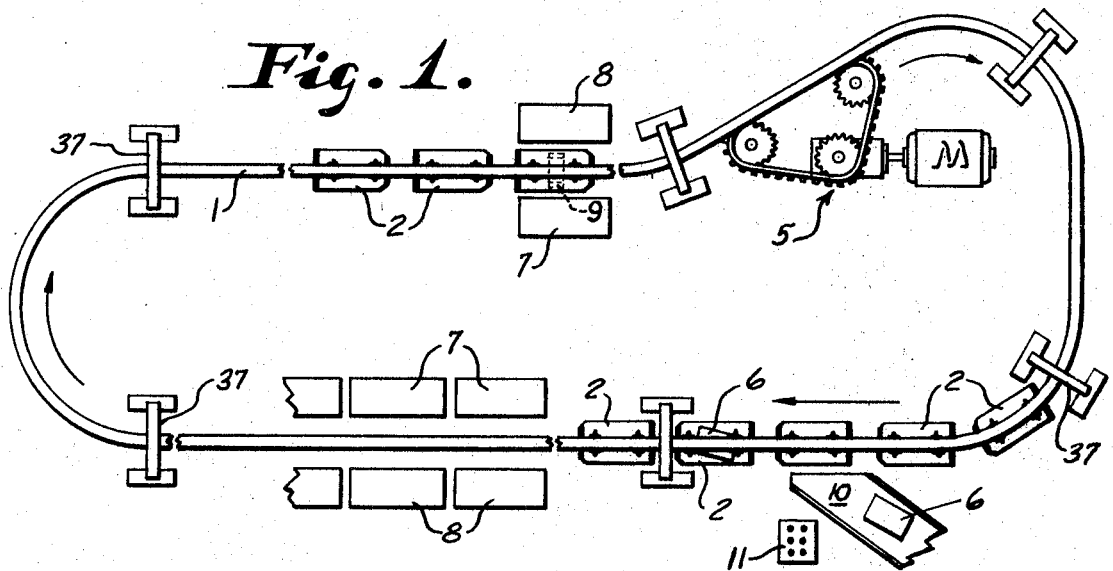
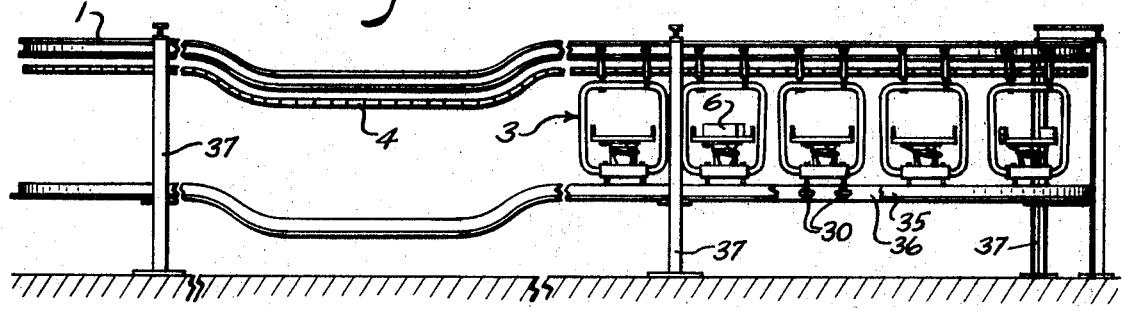
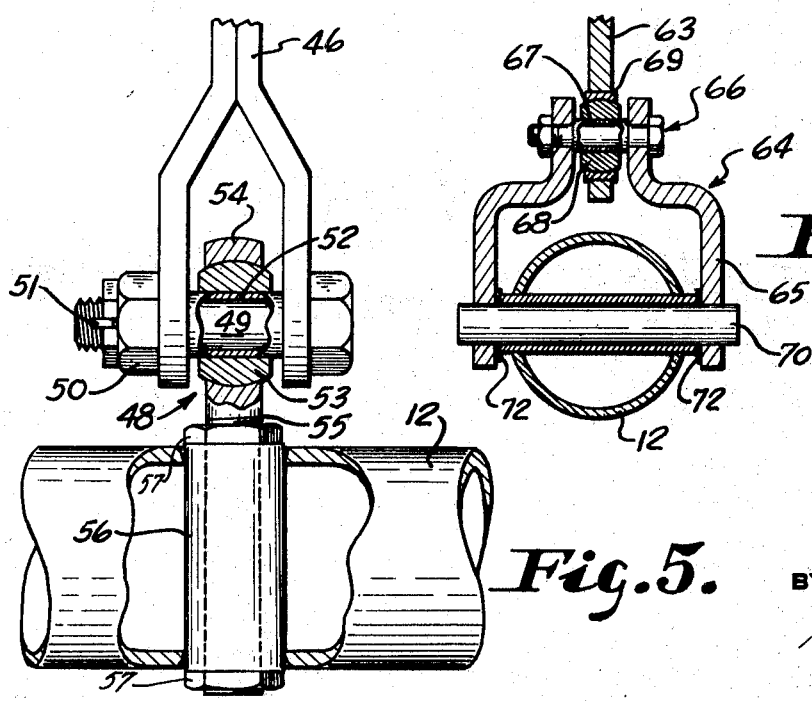
INVENTORS
RICHARD L. SPEAKER
TED J. HARENDA
CARL A. BERGMANN
BY

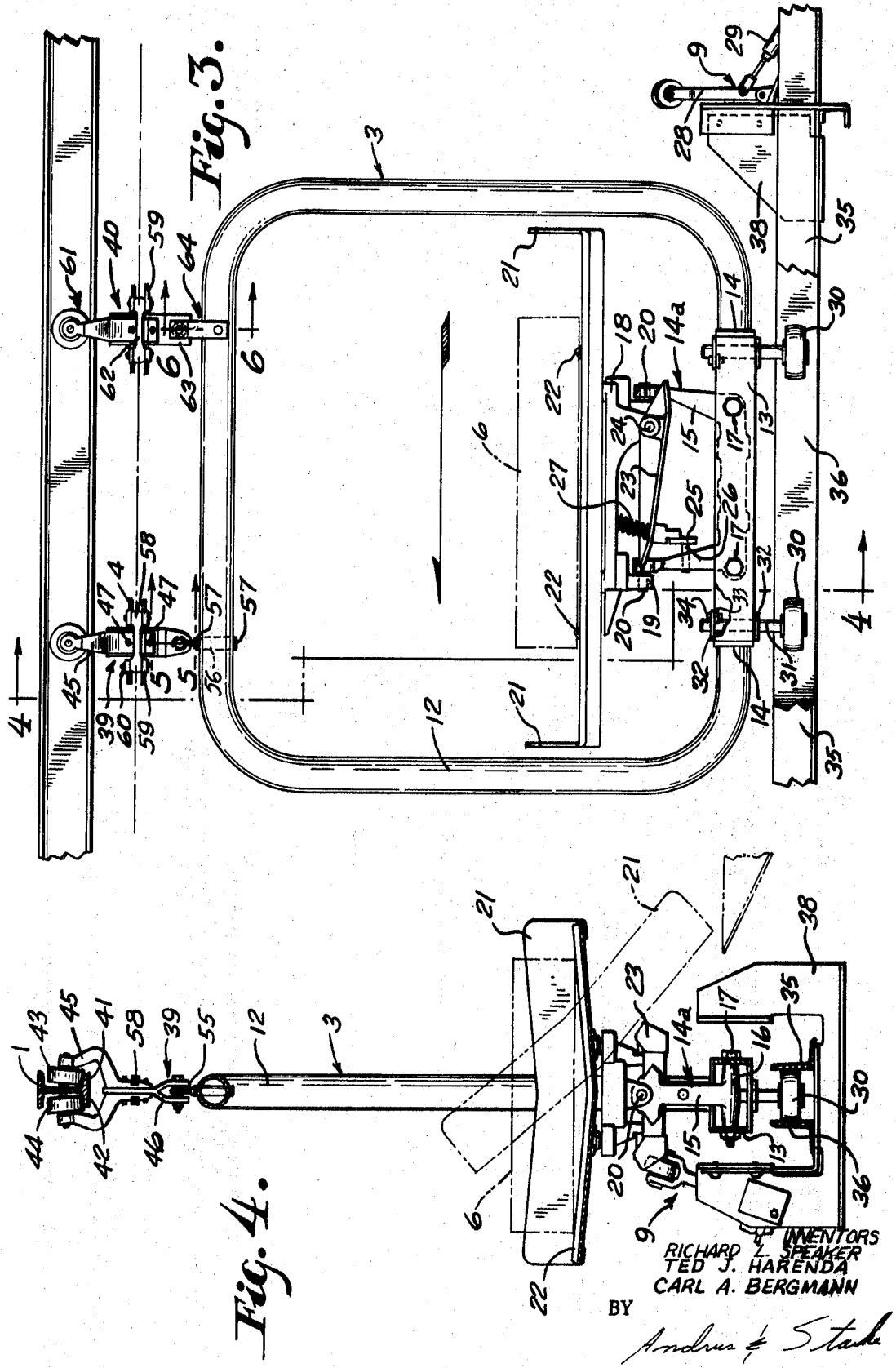

3,528,539
OVERHEAD CONVEYOR APPARATUS
Richard L. Speaker, Hartford, Ted J. Harenda, Muskego, and Carl A. Bergmann, Brookfield, Wis., assignors, by mesne assignments, to Automatic Sprinkler Corporation of America, Cleveland, Ohio, a corporation of Ohio
Filed Apr. 25, 1968, Ser. No. 724,025
Int. Cl. B65g 17/20, 47/34
U.S. Cl. 198—155     16 Claims

ABSTRACT OF THE DISCLOSURE

The disclosure relates to an overhead monorail conveyor means having a series of double tilt trays, each supported by a rectangular tubular planar frame interconnected to a trolley. A leading attachment includes a spherical ball bearing support interconnected by a swivel to the forward portion of the frame and a trailing means includes a spherical bearing unit interconnected by a shackle unit to the trailing end of the frame.

---

This invention relates to an overhead conveyor apparatus and particularly to a monorail construction employing a plurality of individually supported transporting platforms which are adapted to be tilted to a discharge position.

Modern day merchandising and handling of materials has required the development of automatic and semi-automatic sorting and distributing conveying apparatus. For example, the Speaker U.S. Pat. 3,034,665 which issued to R. L. Speaker on May 15, 1962 discloses an unusually satisfactory high speed double tliting tray or platform conveyor mechanism which has permitted high speed automatic and semi-automatic conveying and sorting of articles from one or more loading stations to a plurality of keyed unloading stations. In the Speaker patent, a track structure is supported at ground level with the double tilting tray units supported by a suitable carriage and truck arrangement on the track structure. Although the system is highly satisfactory, certain applications in the industry demand overhead type conveying mechanisms wherein the material supporting or handling devices are suspended from a suitable superstructure and then moved about a given transfer path. Although suspended systems, particularly of the monorail variety have been suggested, they have not been widely employed, and so far as applicant knows, none employs a double tilting tray structure. Further, in single direction tilt systems, problems have been encountered in the design of a suitable suspension support with a commercially practical life. A very severe problem is the proper suspension of the individual units on the track with essentially no horizontal forces on the support or drive mechanism such that each unit hangs in essentially a predetermined vertical plane whether loaded or unloaded. Generally, a one-way pivot system has the load located off center of the supporting monorail trolley arrangement. This tends to create a pendulum effect and imposes a lateral load on the suspension system which results in relatively short life. The problem becomes particularly acute where the track structure curves in horizontal and/or vertical planes which requires the movement of the supports with a generally chordal type action.

The present invention is particularly directed to a novel and improved overhead conveyor means for individually supporting a series of load support platforms or other similar units and particularly to a system which can employ a double tilt tray construction such as that shown in the previously referred to Speaker patent.

Generally, in accordance with the present invention, each of the individual platforms is separately supported by an encircling frame which is interconnected to the track through a pair of spaced attachment means. The principal plane of the frame is in the plane of movement and the pivotal attachment means are secured to the upper end of the frame and spaced in the direction of movement. Each of the pivotal mounts includes a universal pivotal support and more particularly, a spherical bearing unit. This has been found to provide a highly reliable support for the tray structure in both the loaded and unloaded state permitting chordal movement in both a horizontal and an inclined or vertical direction.

The chordal action changes the distance between the trolley units and exerts a tension force on the drive chain. Generally, it has been found that the tension on the chain is more severe with the result of vertical chording action. It has been found that such tension can be further minimized by incorporating a pivoting shackle arrangement in the trailing attachment means.

The platform structure is mounted on the lower or bottom leg of the frame and preferably is a double tilting variety with a pivot yoke or support projecting upwardly from the bottom leg with a centrally located pivot support means in the principal plane of the frame. The platform structure is essentially constructed in a preferred construction in accordance with the teaching of the Speaker Pat. 3,034,665 and includes a suitable cam means cooperative with tip-up devices to allow selective reversed tipping of the structure in either direction. The central pivoting of the platform structure with central location of the load on the platform insures that the load and the supporting arrangement always hangs in the same vertical plane and essentially eliminates lateral loading of the mechanism as a result of pendulum effect.

In accordance with a highly novel and preferred construction of the present invention, the frame structure is formed of a tubular pipe or the like into a rectangular planar configuration having a width somewhat longer than the length of a tray. The double tilting tray structure is supported on the bottom leg and located within the frame structure with the pivot line in the principal plane of the frame. A pair of wheeled trolley units are interconnected to spaced portions of the upper leg of the frame and are movably suspended on an upper monorail track. The leading attachment means includes a spherical ball bearing support rigidly interconnected to a movably suspended support member and to the forward portion of the frame. The trailing unit includes a movably suspended support interconnected to a spherical bearing unit which in turn is interconnected by a shackle unit to the trailing end of the frame. This structure has been found to provide exceptionally satisfactory results in operation for both horizontal and vertical movement of the conveyor system.

The drawings furnished herewith illustrate a preferred construction of the present invention in which the above advantages and features are clearly disclosed, as well as others which will be readily understood from the following description.

In the drawings:

FIG. 1 is a simplified top view of a conveyor system illustrating an application of the present invention;

FIG. 2 is a side view of FIG. 1 showing the track movement and changes in vertical elevation;

FIG. 3 is an enlarged side elevational view of a portion of the conveyor system illustrating one of the carrier subassemblies forming a part of a monorail conveying system for carrying a single load;

FIG. 4 is a vertical section taken generally on line 4—4 of FIG. 3;

FIG. 5 is an enlarged fragmentary view taken generally on line 5—5 of FIG. 3; and FIG. 6 is a similar fragmentary view taken on line 6—6 of FIG. 3.

Referring to the drawings and particularly to FIG. 1, the present invention is shown applied to a monorail overhead conveyor system including a closed loop track 1 formed in an endless loop with curved portions in a horizontal plane and a vertical plane to move between different vertical elevations, as more clearly shown in FIG. 2. A plurality of individual load supporting devices or means, shown as pivotally mounted trays 2, are supported by individual trolley carrier subassemblies 3 movably suspended from the track 1. A common drive chain 4 is interconnected to the several carrier subassemblies 3 and is driven at a given station by a caterpillar-type drive unit 5 or any other suitable means to provide for continuous sequential movement of the individual trays 2 in an endless sequence about the track 1. Each of the trays will normally support a given item or article 6 which is adapted to be deposited in a selected one of a plurality of unloading or receiving stations shown schematically at 7 and 8. The receiving stations may be arranged to either side of the tray 2 which may be correspondingly laterally tilted by the operation of suitable tip-up devices 9 located at the respective stations 7 and 8 to the opposite sides of the tray structure. The article 6 is manually or automatically loaded on the individual trays 2 at a loading station 10 or the like. A memory control unit 11 is actuated to provide automatic timed control of the tip-up devices 9 in accordance with the timed movement of the related tray 2 such that the proper tip-up device 9 is actuated to unload each tray at a selected station 7 or 8. Alternatively, an escort type memory unit may be employed with a coded control forming a part of each subassembly. The memory system and control unit 11 may be of any known or desired construction as long as it properly times actuation of the tip-up devices in accordance with the time required for a tray to move from the key and loading station 10 to the proper receiving stations 7 or 8 and consequently no further detailed description thereof is given. The present invention is particularly directed to the structure of the trolley carrier subassembly and its attachment to the track means which is more fully disclosed in the preferred embodiment in FIGS. 3–6 and described in detail as follows.

Referring particularly to FIG. 3, the illustrated embodiment of the invention includes a separate carrier subassembly 3 for each single tray 2. The carrier subassembly includes an encircling frame 12 which as shown is formed of a tubular pipe of aluminum or the like. The frame 12 is generally a planar member including an integral top leg and side legs with inwardly projecting bottom portions which terminate in spaced relation to each other. A pair of mounting plates 13 span the gap between the bottom ends of the tubular pipe forming frame 12 and are interconnected to each other by a pair of end plates 14 and to the ends of the tubular pipe as by welding or the like to define the bottom leg and a generally rectangular frame having rounded corners. The mounting plates 13 are spaced laterally and symmetrically to the opposite sides of the principal vertical plane through the frame 12.

A truck or carriage assembly is interconnected to the mounting plates 13 to support the tray 2 for pivotal movement to either side of the principal plane of the frame 12. In the illustrated embodiment of the invention, the tray structure and its supporting mechanism which is connected to the plates 13 is generally similar to the structure shown and claimed in the copending application of R. L. Speaker et al. entitled Conveyor System, Ser. No. 672,162 and filed Oct. 2, 1967. As reference may be made to such application for a detailed explanation of the structure, it is briefly described herein and sufficiently to fully explain the present invention.

Generally, a U-shaped yoke 15 has its lower leg or base disposed between the mounting plates 13 and is provided with leading and trailing similar hubs 16 which extend between the plates 13. The yoke 15 is rigidly secured to the plates by a pair of nut and bolt units 17 which extend through the hubs 16 and the mounting plates 13. A tray support 18 is pivotally interconnected to the leading and the trailing end of the upper extending arms of the U-shaped yoke 15 as by pivot connections 19 and 20. As clearly shown in the drawings, the pivot connections include a horizontal axis extending longitudinally of the frame and the movement of the carrier subassembly. Further, the common axis of pivot connections 19 and 20 lies in the principal vertical plane of the frame 12.

The illustrated tray 2 is generally a flat metallic or plastic member bolted to the tray support 18 at four spaced corners of the latter and symmetrically with respect to the vertical plane of frame 12. The cross section of the tray 2 is preferably somewhat slightly V-shaped to assist in the central positioning of the article 6 on the tray 2. The tray 2 includes a front and a back wall 21 to support a load 6. The tray 2 may also be provided with laterally extending ribs 22 to properly locate and support the load thereon.

An index latch and tip-up lever assembly on the support 18 includes a plate-like lever or cam 23 interconnected by a pivot connection 24 to the tray support 18 immediately adjacent the trailing pivot connection 20. The lever 23 projects forwardly to both sides of the pivot connections 19 and 20 with the forward end terminating generally adjacent the forward pivot connection 19, in the illustrated embodiment of the invention. An index plate 25 is secured to the underside of the lever 23 and includes a bottom slot mating with an index pin 26 connected to and extending rearwardly from the forward arm of the U-shaped yoke 15. A spring 27 is disposed between the back side of the lever 23 and the underside of the tray support to continuously urge the lever 23 downwardly with the index plate 25 engaging and latched with the index pin 26.

The illustrated tip-up devices 9 are located one each to the opposite sides of the principal plane of a tray unit and carrier sub-assembly as it passes a receiving station. Each device is adapted to selectively engage the cam lever 23 and sequentially disengage the index plate 25 from the pin 26 and to thereafter positively force the tray 2 into a tilted or tipped position, as shown in phantom in FIG. 4. The illustrated tip-up devices 9 are also generally similar to those shown in the copending Speaker application and consequently are not described in detail. Generally, it is enough to note that they include a tip-up arm 28 normally held in the retracted position out of the path of the cam lever 23. They are interconnected to an air cylinder unit 29 which in turn are electropenumatically actuated by the memory unit 11 to raise the tip-up arm 28 to a tilt position in the path of the cam lever 23 when the proper sub-assembly 3 approaches the proper receiving station 7 or 8.

In the illustrated embodiment of the invention, leading and trailing guide rollers 30 are similary interconnected and secured to the bottom leg of the frame 12. Referring particularly to the forward guide roller 30, a guide roller pin 31 depends from the lower leg and in particular through a pair of top and bottom plates 32 interconnected or welded to the mounting plates 13. A locking bar 33 is disposed between the mounting plates 32 and engages a side recess in the pin 31. The locking bar 33 is held in locking engagement by a pair of small attachment or locking screws 34 which pass downwardly through suitable openings in the top plate 32 and thread into properly threaded openings in the locking bar 33. This rigidly supports the guide pin 31 with the guide roller rotatably mounted on the lower end thereof and located between a pair of L-shaped guide rails 35 and 36. The guide rails 35 and 36 are suitably supported by a plurality of distributed vertical supporting posts 37 to provide a rigid and firm inner support for the assembly.

In the illustrated embodiment of the invention, the rails 35 and 36 also form the support for the tip-up devices 9 which are each secured thereto by a gusset or mounting plate 38 similar to the mounting of the tip-up devices in accordance with this previously referred to copending Speaker et al. application.

The frames 12 are suspended from the track 1 in accordance with the present invention by a particularly novel construction including a leading trolley attachment assembly 39 and a trailing trolley attachment assembly 40.

As most clearly shown in FIGS. 3 and 4, the track 1 is generally an I-beam mounted with the web in a vertical plane and having a lower lateral ledge from the opposite sides thereof defining a pair of rails 41 and 42. The leading attachment trolley assembly 39 includes a pair of trolley wheels 43 and 44 riding one each on the respective rails of the I-beam track 1. The wheels are secured to generally L-shaped plate-like arms 45 with offset legs extending beneath the track; generally symmetrically of the plane through the track. A trolley bracket 46 is clamped between the depending portions of the arms 45 by a pair of vertically spaced nut and bolt units 47. The trolley bracket 46 forms a part of a spherical bearing unit 48.

Referring particularly to FIG. 5, the illustrated unit 48 includes a shaft or pin 49 extending through the offset portions of the trolley brackets 46 and locked therein by a suitable slotted nut 50 and cotter pin 51. A spacer 52 encircles the pin 49 between the trolley brackets 46 to properly space the brackets. The bearing ball 53 is secured or carried on the spacer 52 generally centrally thereof, and is provided with generally planar end faces spaced from the brackets 46. A ball race 54 encircles the bearing ball 53 and includes a depending coupling shaft or rod 55. The ball race 54 is provided with an inner spherical bearing surface complementing the bearing ball 53 and permitting essentially spherical motion in any direction about the interconnection between the bracket 46 and the coupling shaft or rod 55.

The coupling shaft or rod 55 depends into a vertically disposed coupling tube 56 welded within a suitable opening in the frame to define a swivel connection between the bearing unit of the leading attachment means and the frame. The shaft or rod 55 is releasably coupled to the tube 56 as by the locking nut 57 to prevent vertical separation between the two members while permitting relative pivotal movement about an axis normal to the direction of travel between the rod 55 and the tube 56. In this way the leading portion of the frame assembly is supported with essentially unrestricted spherical motion in any direction with respect to the suspended mounting.

In the illustrated embodiment of the invention, the drive chain includes chain links 58 welded to the opposite outer sides of the plate-like arms 45 between the interconnecting nut and bolt units 47. The opposite ends of the chain links 58 secured to adjacent links 59 by suitable pivot connections 60.

The trailing trolley assembly 40 generally includes similar supporting wheels and a depending arm arrangement 61 with a corresponding chain link 62 welded or otherwise interconnected to the arm portion. The trailing assembly 42, however, includes a single trolley attachment plate 63 clamped between the arm members of the assembly 61 and depending downwardly therefrom and connected to the frame 12 by a shackle means or unit 64 which defines a pivot axis and connection normal to the swivel axis of pin 55 and tube 56 and to the principal plane of the frame. The lower end of the trolley attachment plate 63 is apertured and interconnected to a pair of similar offset shackle plates 65 by a nut and bolt unit 66. A spacer 67 on the bolt unit 66 spaces the shackle plates 65 to the opposite sides of the attachment plate 63. A bearing ball 68 is disposed on the spacer 67 and mates with a corresponding bearing race 69 which is welded or otherwise secured within the opening in the attachment plate 63.

The shackle plates 65 depend from the shaft unit 66 and are offset to the opposite sides of the frame 12. A pivot pin or shaft 70 extends laterally through the frame 12 and the lower ends of the shackle plates. Additionally, a suitable tubular bearing member 71 is secured within the opening to the frame and extends between the inner surfaces of the shackle plates 64 with suitable bearing washers 72 disposed to the opposite ends thereof. The shackle plates 64 and shaft 65 provide a pivotal interconnection between the bearing unit attachment and the frame 12 to allow additional pivotal movement about a generally horizontal or lateral axis through the frame 12, as well as the universal pivotal movement generally provided by the spherical bearing construction.

The operation of the illustrated conveyor system is briefly summarized as follows.

The several carrier sub-assemblies 3 are mounted on the monorail track 1 as shown in FIGS. 3–6 and interconnected to the drive chain 4 for sequential movement between the loading station 10 and the unloading stations 7 and 8. As an article 6 is placed on a tray 2, the memory unit 11 is actuated to provide a memory of the station at which the particular tray 2 is to be unloaded. The assembly moves about the monorail track 1 and as the proper tray 2 approaches the selected unloading station 7 or 8, the related tip-up device 9 is automatically actuated and raised to the proper side of the tray 2 to tip the tray structure. As the carrier sub-assembly 3 moves past the unloading station, the arm 28 engages the carriage lever 23 to sequentially unlatch and positively tip the tray 2. Pivotal mounting of the tray structure permits the unloading to either side of the track system, generally in accordance with the previous Speaker et al. patent application. The unloading stations 7 and 8 may be directly across from each other or staggered in any desired manner. Of course, in any given application, unloading stations may also be provided on only one side of the track 1.

The carrier subassemblies 3 with the separate universal ball suspension units in the trolley attachment assemblies 39 and 40 have been found to maintain stable mounting and movement of the subassemblies in both the horizontal and curved portions of the track 1. The shackle unit 64 has been found to be particularly desirable in connection with movement in the vertical direction where additional compensation might be required.

The symmetrical mounting of the structure with the central loading of the tray 2 or other transporting means and the placement of the pivot structure and support in a single common plane has been found to provide a very stable and reliable support wherein the carrier subassembly 3 in both the loaded and the unloaded position hang essentially in a perfectly vertical manner without imparting any appreciable lateral wear or force on the trolley suspension system other than the vertical forces for which they are designed. As previously noted, this is a direct contrast to the previous devices which generally employed offset mechanisms and introduced pendulum forces with adverse wear on the chain, trolleys, guide wheels and other interconnecting hardware. The tubular frame and multiple support for the frame particularly with the trailing shackle arrangement for permitting extended vertical chordal action, has been found to be particularly significant in the provision of a highly satisfactory overhead monorail conveyor or sorter system wherein both horizontal and vertical curves are encountered. The present invention thus provides a highly impoved overhead monorail system for distributing and transporting of articles from one location to one or more other locations.

What is claimed is:

1. An overhead conveyor unit including an overhead track means having curved portions and a plurality of individual carrier means supported on said track means a pair of depending attachment units for each of said carrier means and having means riding on said track means and being connected in fixed spaced relation to the said carrier means longitudinally of the track means and each including a ball-type spherical bearing unit to support the carrier means upon said track means and permitting motion in essentially any direction.

2. The overhead conveyor unit of claim 1 wherein said overhead track means includes curved portions in a vertical plane and the trailing depending attachment unit includes a shackle unit.

3. The overhead conveyor unit of claim 1 wherein said overhead track means includes curved portions in a vertical plane and the trailing depending attachment unit includes a shackle unit connected between the spherical bearing unit and a frame forming a part of the carrier means to support the carrier means upon said track means, and a swivel connection between the frame and the spherical bearing unit of the leading attachment unit.

4. The overhead conveyor unit of claim 1 wherein said overhead track means includes horizontal curved portions and vertical curved portions, said carrier means includes a supporting frame, said leading attachment unit including a swivel pin and tube connected respectively one each to the frame and to the corresponding bearing unit with the swivel axis in the principal plane of the frame, and said trailing attachment unit including a pivotal pinned connected between the corresponding bearing unit and frame with a pivot axis normal to the swivel axis and the principal plane of the frame.

5. The overhead conveyor unit of claim 1 wherein said carrier means includes a frame having an upper leg and a coplanar lower leg, said attachment units being connected to said upper leg, and a two-way tilting platform pivotally mounted to said lower leg with the pivot axis in the plane of said upper and lower legs.

6. The overhead conveyor unit of claim 1 wherein said carrier means includes a frame having an upper leg and a coplanar lower leg, said attachment units being connected to said upper leg, and a two-way tilting platform pivotally mounted to said lower leg with the pivot axis in the plane of said upper and lower legs, releasable means secured to the platform and the lower leg to hold the platform in a transport position generally normal to the plane of said legs, and a rigid guide means provided at an unloading station beneath and in alignment with said lower leg, means connected to said guide means and disposed to opposite sides of said track means to selectively engage said releasable means and selectively pivot the platform to opposite sides of said track means.

7. In a monorail conveyor carrier subassembly, a frame having a top leg and a spaced bottom leg in a common plane, a pair of laterally spaced hanging supports secured in longitudinally fixed relation to the top leg of the frame in longitudinal spaced relation, each of said supports including spherical bearing means to permit relative universal pivotal movement of the frame relative to the upper ends of the supports, a pivotal support means secured within said frame to the bottom leg of said frame and having the pivot axis in the plane of said frame, and a platform member secured to said pivotal support means and being constructed and arranged with the support means essentially symmetrically of said plane.

8. The monorail conveyor carrier subassembly of claim 7 wherein said frame is a generally closed member, said trailing hanging support longitudinally spaced including a shackle means connected between the corresponding spherical bearing means and frame, and said platform and pivotal support means being disposed within the frame.

9. The carrier subassembly of claim 7 wherein said frame is a generally rectangular frame disposed in a vertical plane and having the top and sides and outer portions of the bottom formed of an integral tubular element and a pair of laterally spaced mounting plates connected to the bottom portions of the tubular element, a carriage support disposed between said plates and releasably connected thereto, said carriage support extending upwardly into the frame and terminating in said pivot support means having a horizontal axis in the plane of the frame, said platform means is connected to said pivot support means and projects symmetrically to opposite sides of said axis.

10. The carrier subassembly of claim 7 wherein said frame is generally rectangular and is maintained in a vertical plane and having the top and sides and outer portions of the bottom formed of an integral tubular element and a pair of laterally spaced mounting plates connected to the bottom portions of the tubular element, a carriage support disposed between said plates and releasably connected thereto, said carriage support extending upwardly into the frame and terminating in said pivot support means with a horizontal axis in the plane of the frame, said platform means supporting an article symmetrically disposed over said axis, said hanging supports including a leading trolley attachment assembly including a pair of wheel means adapted to ride on the track means and having depending L-shaped support arms terminating in aligned plate-like portions and interconnected by nut and bolt units, a trolley attachment bracket having a planar end clamped between the plate-like portions and interconnected by nut and bolt units, a trolley attachment bracket having a planar end clamped beween the plate-like portions and a bifurcated lower end, a bearing mounted on a shaft and having a spherical periphery and connected between said bifurcated lower end, a spherical bearing race journaled on said bearing and complementing said spherical periphery and having a depending shaft secured within the vertical tube for pivotal movement about a vertical axis, a trailing trolley attachment assembly including a pair of opposed wheel means adapted to ride on the track means and having depending support arms terminating in aligned plate-like portions and interconnected by nut and bolt units, a trolley attachment bracket clamped between the latter plate-like portions and having an apertured lower end, an annular bearing race secured within the opening, a bearing mounted on a bearing shaft and disposed within the bearing race and having a complementing spherical periphery, and a shackle unit secured to said bearing shaft and having a pivot pin journaled in the top of the tubular frame.

11. The carrier subassembly of claim 7 wherein said first support includes a leading trolley unit including a pair of opposed wheel means adapted to ride on the track means and having depending L-shaped support arms terminating in aligned plate-like portions and interconnected by nut and bolt units, a trolley attachment bracket having a planar end clamped between the plate-like portions and interconnected by nut and bolt units, a frame attachment bracket clamped between the plate-like portions and depending therefrom and terminating in a bifurcated lower end, a bearing mounted on a shaft and having a spherical periphery and connected between said bifurcated lower end, a spherical bearing race journaled on said bearing and complementing said spherical periphery and having a depending shaft secured within the vertical tube for pivotal movement about a vertical axis, a trailing trolley attachment assembly forming the second support and including a pair of opposed wheel means adapted to ride on the track means and having depending support arms terminating in aligned plate-like portions and interconnected by nut and bolt units, a frame attachment bracket clamped between the latter plate-like portions and having an apertured lower end, an annular bearing race secured within the opening, a bearing mounted on a bearing shaft and disposed within the bearing race and having a complementing spherical periphery, and a shackle unit secured to said bearing shaft and having a lateral pivot pin journaled in the top of the frame.

12. The carrier subassembly of claim 7 having guide means secured to said bottom leg and extending downwardly therefrom.

13. An overhead conveyor carrier unit including an overhead track means, a support frame having an upper support secured to an overhead track means and a lower frame member, a rigid guide means disposed adjacent the lower frame member at the unloading stations, a guide member secured to the frame and coupled to said guide means, a two-way tilting platform having a pivotally mounted understructure secured to said lower frame member and within said frame, releasable means secured to the platform and the lower frame member to hold the platform in a transport position generally normal to the plane of said legs, and means secured to said guide means and disposed to opposite sides of said track means to selectively engage said releasable means and selectively pivot the platform to opposite sides of said track means.

14. The overhead conveyor carrier unit of claim 13 wherein said support frame includes a top leg and a spaced bottom leg in a common plane, said top leg having means for securement to the overhead track means, and said platform being secured to said bottom leg and being constructed and arranged essentially symmetrically of a plane through said top leg and bottom leg.

15. The overhead conveyor unit of claim 13 wherein said frame is an encircling member having a top leg, side legs and a bottom leg, said platform and understructure being disposed within said encircling member and secured to said bottom leg.

16. The overhead conveyor unit of claim 13 wherein said frame is an encircling member having a top leg, side legs and a bottom leg, said top leg and side legs being integrally formed of a tubular pipe member with the lower side ends bent inwardly, said bottom leg including plate means secured to and spanning the space between said inwardly bent side ends, said platform and understructure being disposed within said encircling member and secured to said plate means defining said bottom leg.

References Cited

UNITED STATES PATENTS

| | | | |
|---|---|---|---|
| 2,792,927 | 5/1957 | Mullen et al. | 198—177 |
| 3,034,665 | 5/1962 | Speaker | 198—155 XR |
| 3,223,226 | 12/1965 | Bishop | 198—155 |
| 3,261,479 | 7/1966 | Baker et al. | 294—85 XR |

ROBERT G. SHERIDAN, Primary Examiner

U.S. Cl. X.R.

104—88, 89; 105—146, 156; 198—177